United States Patent
Chang

(10) Patent No.: US 6,954,629 B2
(45) Date of Patent: Oct. 11, 2005

(54) POLICE-EMERGENCY SYSTEM WITH WIRELESS COMMUNICATION

(75) Inventor: Min-Yi Chang, Hsinchu (TW)

(73) Assignee: Industrial Technology Research Institute, Hsin Chu (TW)

( * ) Notice: Subject to any disclaimer, the term of this patent is extended or adjusted under 35 U.S.C. 154(b) by 320 days.

(21) Appl. No.: 10/444,132

(22) Filed: May 23, 2003

(65) Prior Publication Data

US 2004/0235448 A1 Nov. 25, 2004

(51) Int. Cl.[7] ............................................. H04M 11/00
(52) U.S. Cl. ................ 455/404.1; 455/457; 455/456.3; 370/328
(58) Field of Search ............................. 455/404.1, 457, 455/456.3; 370/328, 352; 340/426.1, 426; 600/300

(56) References Cited

U.S. PATENT DOCUMENTS

| | | | | |
|---|---|---|---|---|
| 6,587,040 B2 | * | 7/2003 | Seto | 340/426.1 |
| 6,868,074 B1 | * | 3/2005 | Hanson | 370/328 |
| 2001/0002815 A1 | * | 6/2001 | Seto | 340/426 |
| 2003/0057278 A1 | * | 3/2003 | Wong | 235/451 |
| 2003/0216625 A1 | * | 11/2003 | Phipps | 600/300 |
| 2004/0146047 A1 | * | 7/2004 | Turcan et al. | 370/352 |

* cited by examiner

*Primary Examiner*—Sonny Trinh
*Assistant Examiner*—Phuoc Doan
(74) *Attorney, Agent, or Firm*—Rabin & Berdo, P.C.

(57) ABSTRACT

A police-emergency system of wireless communication which is to generate a signal by a control circuit of the magnetic card and transmits the signal onto the host server through the wireless communication module of said magnetic card, after the host server receives the signal coming from the magnetic card, it judges if the signal is in conformity with the data in the database by the microprocessor such that the signal will be transmitted onto the police-emergency system of police-citizen connection to notice the policemen arrive on the scene where crime happened.

11 Claims, 3 Drawing Sheets

POLICE-EMERGENCY SYSTEM WITH WIRELESS COMMUNICATION

BACKGROUND OF THE INVENTION

1. Field of the Invention

This invention relates to a kind of police-emergency system with wireless communication which is composted by a magnetic card, a host server and a police-emergency system of police-citizen connection, this invention identifies the I.D. by utilizing an identification devices of a magnetic card and to press the emergency button of said magnetic card control circuit and a confirm button to generate a signal to transmit the signal through the wireless communication module of said magnetic card onto the host server, after said server host has been received the signal coming from the magnetic card, it judges if said signal is in conformity with the data in the database through the microprocessor such that the signal is being transmitted onto the police-emergency system of police-citizen connection so that the policemen will arrive on the scene in time.

2. Description of the Prior Art

Accordingly, there occurs lots of money or expensive materials in the locations such as the banks, the jewelry shops, the farming and fishing cooperation as well as the supermarket being robbed; although said locations are installed a police-emergency system with police-citizen connection; however, since the evil man is easily to control and trigger the button in rubbing, or he will control the movement of the citizen by which will lead to lose the first police-emergency on crime report time so that the citizens calls to the police after the events and the evil man is disappear already which loses the timing of solving this case.

From that it is seen clearly that the above-mentioned conventional way having lots of drawback which is not a better designer and requires being better. The inventor of this invention thinks to better it due to many drawbacks derived from the above-mentioned conventional way and experiences and study for many years and finally research and develop a police-emergency system of wireless communication of this invention successfully so that each member could utilize said system at the first time and notice the policemen to go to the on the scene to catch the bad man successfully.

SUMMARY OF THE INVENTION

The police-emergency system which could achieve the above-mentioned object of invention is comprised of a magnetic card, a host server and a police-emergency system of police-citizen connection, when there happened an accident event, the magnetic card user pushes the emergency button as well as the confirm button to generate a signal wherein said signal is wireless transmitted to the host server through the wireless communication module of the magnetic card, the host server compares the data in the database; when the data is in conformity with the required one, the signal is being transmitted onto the police-emergency system of police-citizen connection through the host server such that the policemen arrive on the scene immediately wherein said magnetic card comprises:

An identification device wherein said device could be used to identify the I.D. with the way of using the bar code, electronic code or the integrated circuit (IC) card through the way of bar code scanner, the reader or the card reader;

A wireless communication module which uses the way of Radio Frequency (RF) or BLUETOOTH to perform receiving and signal transmission with the host server;

A battery device which is used to provide the power toward said magnetic card;

A sound-light device which is used to remind the people the usage condition of battery, said sound-light device could be LED device to remind the magnetic card user or the bee-sounder to express the sound to remind the magnetic card user;

A control circuit having an emergency button and a confirm button, when the host of the server receives a signal to confirm the condition of absentee of the users, the control circuit of said magnetic card, the control circuit of said magnetic card will response automatically to manage the condition of absentee of the employees with efficiency; besides, when there happened the emergency conditions on the scene, the user pushes the emergency button and the confirmation button to generate a signal, said signal is transmitted onto the host server through the wireless communication module of the magnetic card, after receiving the signal from the magnetic card, the microprocessor will compare the data of the user from the database to confirm the I.D. of the user; once the I.D. is confirmed, said host server transmits the data onto the police-emergency system of police-citizen connection to notice the policemen to go to the scene where the crime happens wherein said emergency button and said confirm button could be the press device or the thin-film device;

BRIEF DESCRIPTION OF THE DRAWINGS

The drawings disclose an illustrative embodiment of the present invention which serves to exemplify the various advantages and objects hereof, and are as follows.

DETAILED DESCRIPTION OF THE PREFERRED EMBODIMENT

Figure 1:
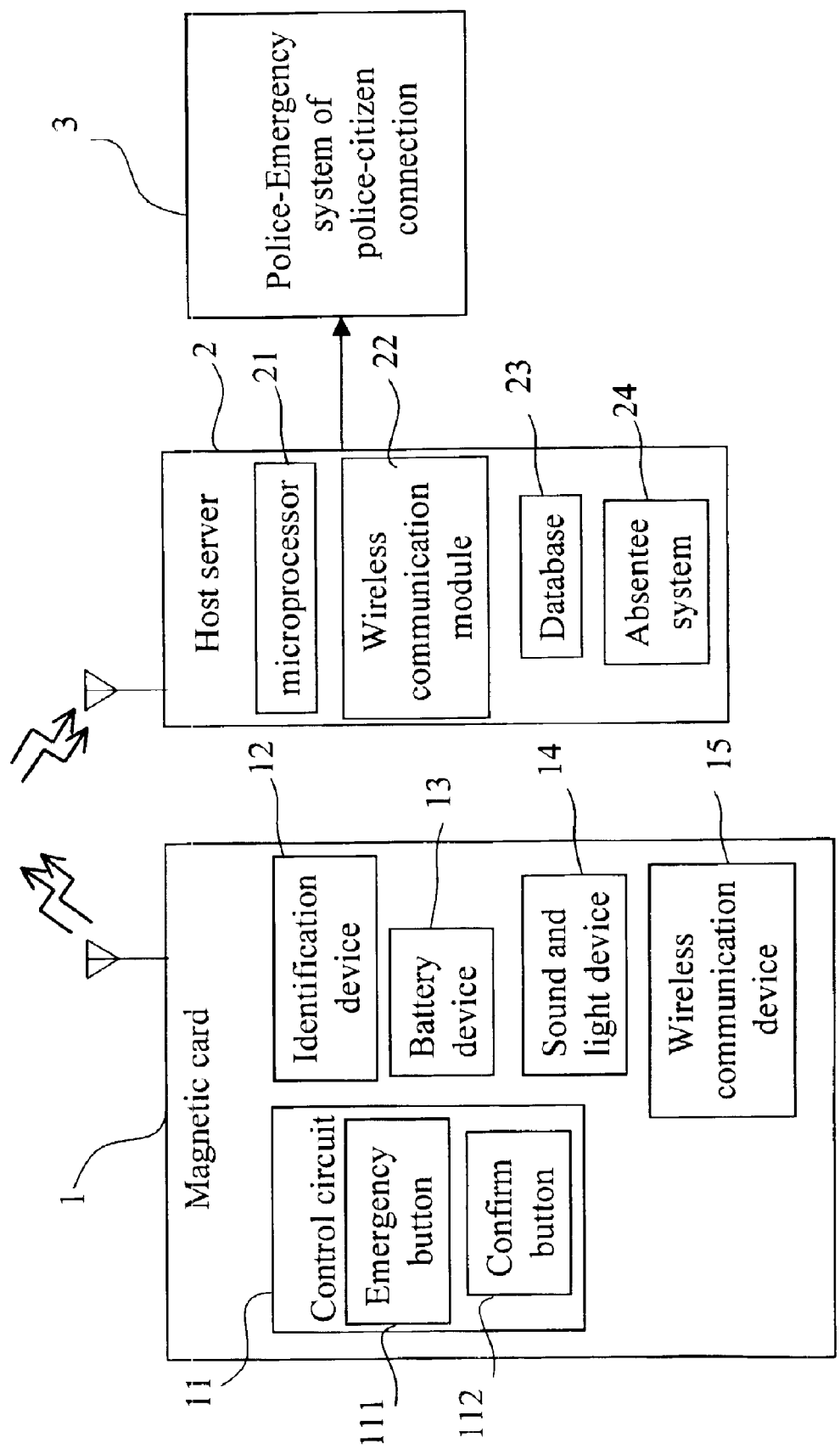
FIG. 1 is the structural diagram of this invention.

Please refer to FIG. 1, which illustrates the preferred embodiment of this invention. The police-emergency system of wireless communication is composed of a magnetic card 1, a host server 2, and a police-emergency system of police-citizen connection 3; when there happens an abrupt event, the user of the magnetic card press down the emergency button 111 and the confirm button 112 in the control circuit 11 concurrently to generate a signal, said signal is transmitted through wireless transmission to the host server 2 through the wireless communication module 15 of the magnetic card 1, when the host server 2 receives the signal coming from the magnetic card 1, said micro-processor 21 compares the data in the database 23 and judge if it is in conformity. When the microprocessor 21 receives the signal sending from both the emergency button 111 and the confirm button 112 concurrently, the microprocessor 21 will first compare if the user i.d. is in conformity with that in the database 23, if yes, the microprocessor will send a signal to the police-emergency system of police-citizen connection 3 to notice the policemen to go to the on the scene to deal with at the first time; wherein said magnetic card 1 comprises mainly:

An identification device 12: said identification could utilize the way of human identification, or the usage of bar-code reading such as the bar-code reader, for example the IC card, or the electronic code-reader;

A wireless communication device 15: This receives and transmits the signal wirelessly with Radio Frequency or Bluetooth technology;

A battery device 13: This provides the power toward said magnetic card;

A sound and light device 14: which reminds the battery usage condition; said sound and light device 14 could be the LED device or the bee sounder to remind the user of the magnetic card;

A control circuit 11: which is composed of an emergency button 111 and a confirm button 112, when the host server 2 sends a signal to confirm the condition of the user, the control circuit 11 of said magnetic card 1 will response automatically; when there happens an abrupt events, the user will press down the emergency button 111 and the confirm button 112 concurrently to generate a signal, said signal will be transmitted to the host server 2 through the wireless communication module 15 of the magnetic card 1, after the host server 2 receives the signal from the magnetic card 1, the microprocessor 21 compares the data in the database 23 and conform the I.D. of the user, once the I.D. being conformed, the signal will be transmitted to the police-emergency system of police-citizen connection 3 to notice the policemen to come to the scene to deal with; wherein said emergency button 111 and the confirm button 112 cold be press device or thin film device.

A police-emergency system of wireless communication which could achieve the above-mentioned object of this invention wherein the host server 2 of said invention comprises:

A wireless communication module 22, which is to receive and to transmit the signal with wireless way to the magnetic card 1;

A database 23 which is used to establish the data as well as to store the absentee data of the company staffs;

An absentee system 24 which is used to manage the absentee condition of company staffs;

A microprocessor 21, when the host server 2 receives the signal coming from the magnetic card 1, said microprocessor 21 compares the data in the database 23 and judge if it is in conformity. When the microprocessor 21 receives the signal sending from both the emergency button 111 and the confirm button 112 concurrently, the microprocessor 21 will first compare if the user I.D. is in conformity with that in the database 23, if yes, the microprocessor will send a signal to the police-emergency system of police-citizen connection 3 to notice the policemen to go to the on the scene to deal with at that time; besides, said microprocessor 21 catches the data from the database 23 and transmits the signal through the wireless communication module 22 onto the magnetic card user 1, said magnetic card 1 generates a signal automatically, said signal is then transmitted onto the host server 2 through the wireless communication module 22 of the magnetic card user 1, the microprocessor 21 of the hose server 2 compares the signal with the data of the database 23 and transmits the data onto the absentee system 24 to manage the absentee condition of the employees in the company.

Figure 2:
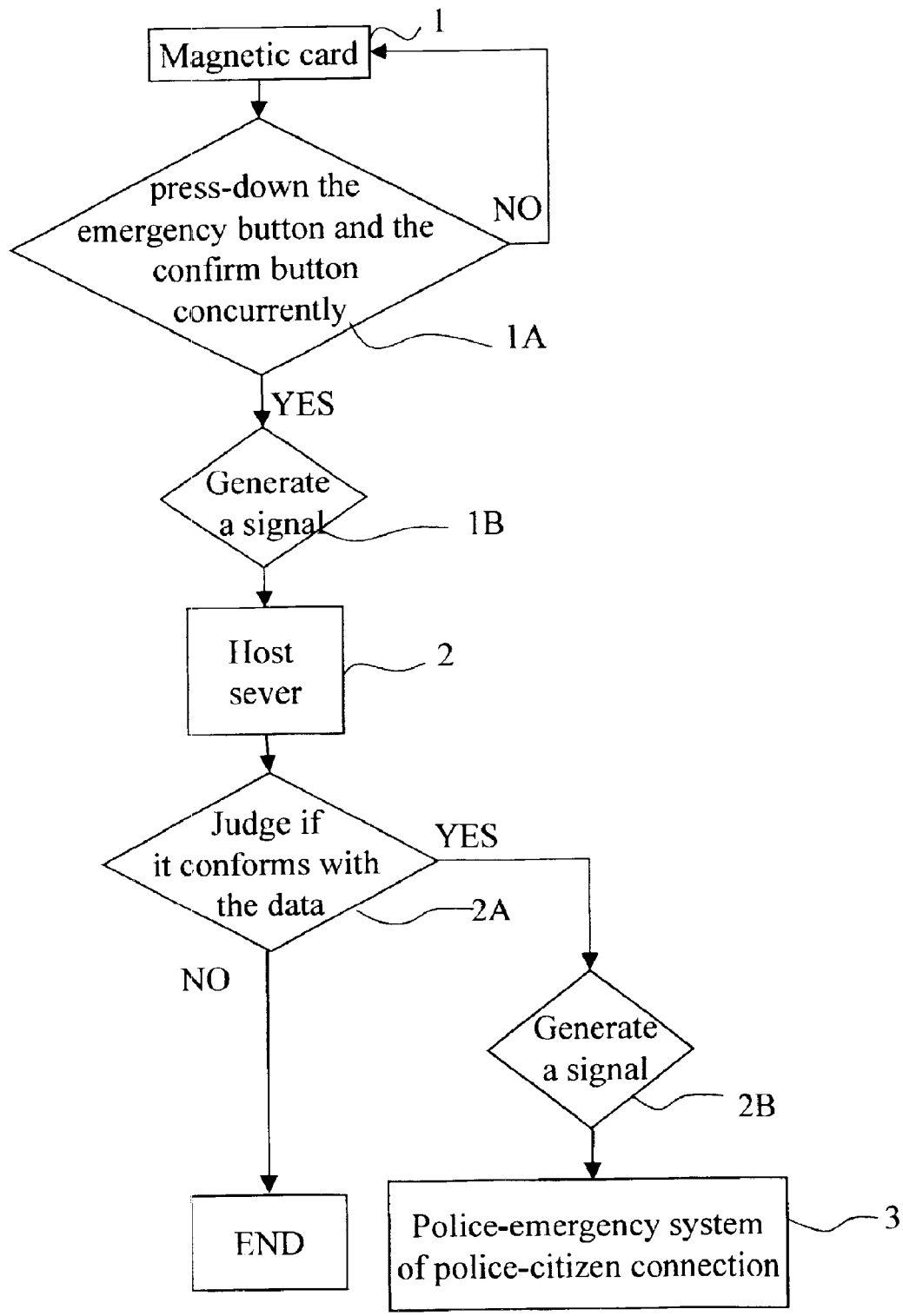
FIG. 2 is the flow diagram of police-emergency of this invention.

Please refer to FIG. 2, which is the police-emergency flow diagram of this invention, when there happens an abrupt event, the user of the magnetic card 1 press down the emergency button 111 and the confirm button 112 of the control circuit on the same time which will generate a signal 1B, said signal 1B will be transmitted onto the host server 2 through the wireless communication module 15 of the magnetic card 1, the microprocessor 21 of the host server 2 compares the signal with the data in the database 23 to judge if the data is in conformity with 2A, if the data is in conformity, it will generate a signal 2B and transmit the signal onto the police-emergency system of the police-citizen connection 3 through the host server to have connection with the policemen directly such that the policemen will arrive on the scene in that time; if the data comparison is not in conformity, end up such motion.

Figure 3:
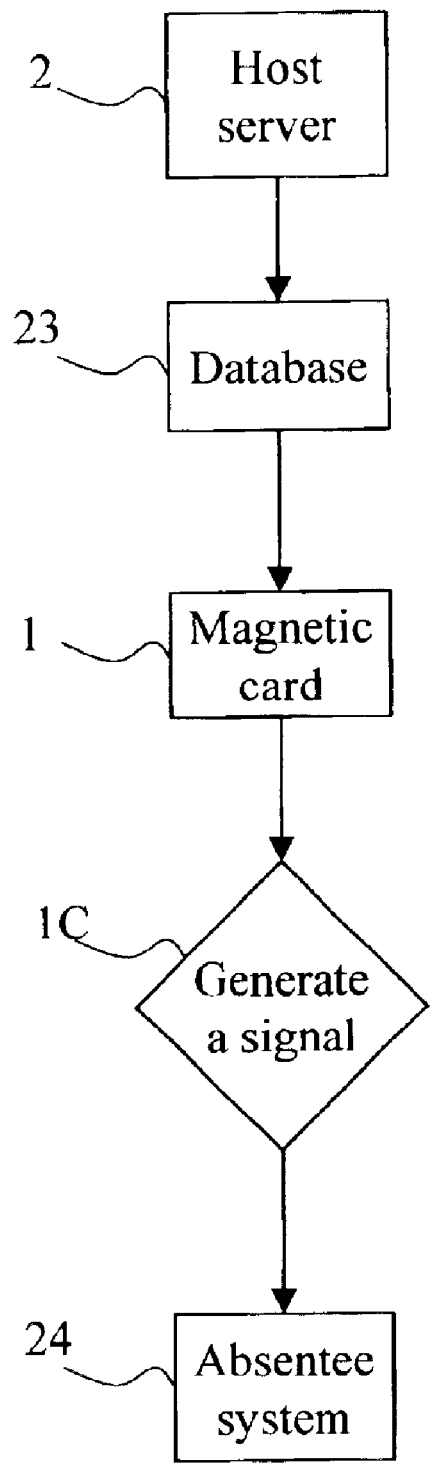
FIG. 3 is the flow diagram of the management of the absentee of the staffs of this invention.

Please refer to FIG. 3, which is the absentee management flow diagram of the staffs of this invention, the microprocessor 21 of said host server 2 grasps the data from the database and transmits the signal onto the user of the magnetic card 1 through the wireless communication module 22, said magnetic card 1 generates a signal automatically, said signal is transmitted onto the host server 2 through the wireless communication module 15 of the magnetic card 1, the microprocessor 21 of said host server 2 compares the signal with the data in the database 23 and transmit the data to the absentee system 24 to manage the absentee condition of the company employees.

The police-emergency system of wireless communication provided by this invention has the following advantages:

1. It provides the on the scene staffs to notice the policemen in the first time when the abrupt events happens to guard the property and life safety.

2. It is not limit by the location since it communicates with wireless communication way to maintain the safety of your lives.

3. It could be used as the management of absentee by combination of the identification card.

Many changes and modifications in the above described embodiment of the invention can, of course, be carried out without departing from the scope thereof. Accordingly, to promote the progress in science and the useful arts, the invention is disclosed and is intended to be limited only by the scope of the appended claims.

What is claimed is:

1. A police-emergency system of wireless communication comprising:

a magnetic card composed of an identification device, a battery device, a sound-light device, a control circuit, a wireless communication module wherein said control circuit comprising an emergency button and a confirm button; said magnetic card which utilizes the control circuit to generate a signal;

a host server comprising a wireless communication module, a system, a database and a microprocessor; said host server which receives the signal from the magnetic card and judges the source of the signal; and a police-emergency system of police-citizen connection receiving the signal from said host server and connecting with the policemen immediately for the police to go on the scene in time;

thereof said identification device of said magnetic card used as an identification of the user, when there the emergency events happened, the user pressing-down the emergency button and the confirm button concurrently to generate a signal and the signal which will be transmitted onto the host server through the wireless communication module;

the wireless communication module of said server receiving the signal coming from the magnetic card and transmitting the signal onto the microprocessor; said processor comparing the data in the database to judge whether the signal source in conformity with the data in the database; if yes, said signal transmitted by said host server onto the police immediately for the policemen arrive on the scene where crimes happened.

2. The police-emergency system as mentioned in claim 1, wherein the identification device of said magnetic card achieves the I.D. identification through the way of bar-code reading by the bar-code scanner.

3. The police-emergency system as mentioned in claim 1, wherein the identification device of said magnetic card achieves the I.D. identification through the way of bar-code reading by the bar-code scanner which is an electronic bar.

4. The police-emergency system as mentioned in claim 1, wherein the identification device of said magnetic card achieves the I.D. identification through the way of bar-code reading by the bar-code scanner of which the card is an integrated circuit (IC) card.

5. The police-emergency system as mentioned in claim 1, wherein the transmitting way is radio frequency (RF) transmittance for the wireless communication module of the magnetic card and the host server.

6. The police-emergency system as mentioned in claim 1, wherein the transmitting way is BLUETOOTH transmittance for the wireless communication module of the magnetic card and the host server.

7. The police-emergency system as mentioned in claim 1, wherein the control circuit of said magnetic card comprises an emergency button and a confirm button, wherein said emergency button and confirm button is a press device which is used to trigger a signal to the control circuit and transmits the signal to the host server through the control circuit.

8. The police-emergency system as mentioned in claim 1, wherein the control circuit of said magnetic card comprises an emergency button and a confirm button, wherein said emergency button and confirm button is a thin-film device which is used to trigger a signal to the control circuit and transmits the signal to the host server through the control circuit.

9. The police-emergency system as mentioned in claim 1, wherein the sound-light device of said magnetic card is LED which is used to show the condition of battery power.

10. The police-emergency system as mentioned in claim 1, wherein the sound-light device of said magnetic card is a bee-sounder which is used to make noise and remind the condition of battery power.

11. The police-emergency system as mentioned in claim 1, wherein the system of the host server utilizes the microprocessor to catch the data inside the database and transmits the signal onto the magnetic card through the wireless communication module, the control circuit of said magnetic card will generate a response signal automatically, said signal is transmitted to the host server through the wireless communication module, the microprocessor of said host server compares the signal with the data in the database and transmit the data to the absentee system to manage the absentee condition of the staffs.

* * * * *